United States Patent
Kim (10) Patent No.: US 12,046,913 B2
(45) Date of Patent: Jul. 23, 2024

(54) WIRELESS CHARGING MAGNETIC MATERIAL AND MANUFACTURING METHOD THEREOF

(71) Applicants: Hyundai Motor Company, Seoul (KR); Kia Corporation, Seoul (KR)

(72) Inventor: Youngmin Kim, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/078,190

(22) Filed: Dec. 9, 2022

(65) Prior Publication Data

US 2024/0006915 A1  Jan. 4, 2024

(30) Foreign Application Priority Data

Jun. 30, 2022 (KR) .................. 10-2022-0080533

(51) Int. Cl.
*H02J 50/00* (2016.01)
*B22F 3/12* (2006.01)
*B22F 5/00* (2006.01)
*H01F 1/34* (2006.01)
*H01F 1/36* (2006.01)

(52) U.S. Cl.
CPC .............. *H02J 50/005* (2020.01); *B22F 3/12* (2013.01); *B22F 5/006* (2013.01); *H01F 1/344* (2013.01); *H01F 1/36* (2013.01); *B22F 2302/25* (2013.01)

(58) Field of Classification Search
CPC ....... H05K 9/0081; H01F 1/047; H01F 1/147; H01F 1/20; H01F 1/22; H01F 1/33; H01F 1/34; H01F 1/36; H01F 3/02; H01F 27/36; H01F 27/361; H01F 27/366; H01F 1/344; H02J 50/005; B22F 3/12; B22F 5/006; B22F 2302/25
See application file for complete search history.

(56) References Cited

U.S. PATENT DOCUMENTS

| 3,308,462 A | * | 3/1967 | Gluck | .................. H05K 9/0003 |
| | | | | 293/DIG. 6 |
| 7,879,269 B1 | * | 2/2011 | Dening | ............... H01F 41/0246 |
| | | | | 264/122 |
| 2015/0130582 A1 | | 5/2015 | Hyun et al. | |

(Continued)

FOREIGN PATENT DOCUMENTS

| CN | 106208397 A | 12/2016 |
| CN | 109575511 A | 4/2019 |

(Continued)

OTHER PUBLICATIONS

Zhang et al. ("Loosely coupled transformer structure and interoperability study for EV wireless charging systems." IEEE Transactions on Power Electronics 30.11 (2015): 6356-6367.). (Year: 2015).*

*Primary Examiner* — Samir Shah
*Assistant Examiner* — Ricardo D Morales
(74) *Attorney, Agent, or Firm* — Fox Rothschild LLP (57) ABSTRACT

Provided is a wireless charging magnetic material including a Mn—Zn ferrite sintered body; a thermosetting powder coating; and a Mn—Zn ferrite sintered powder, wherein the Mn—Zn ferrite sintered body includes a Mn—Zn ferrite sintered tile or a Mn—Zn ferrite sintered chip, and the wireless charging magnetic material may be implemented in a three-dimensional shape.

11 Claims, 7 Drawing Sheets

(56) References Cited

U.S. PATENT DOCUMENTS

2015/0247289 A1* 9/2015 Kawaguchi ............ D21H 21/52
                                                          162/132
2022/0130604 A1* 4/2022 You ..................... H01F 27/36

FOREIGN PATENT DOCUMENTS

| CN | 110060832 A | 7/2019 |
|----|-------------|--------|
| KR | 10-2021-0065646 A | 6/2021 |
| KR | 102312981 B1 | 10/2021 |
| KR | 10-2022-0035040 A | 3/2022 |

* cited by examiner

WIRELESS CHARGING MAGNETIC MATERIAL AND MANUFACTURING METHOD THEREOF

CROSS-REFERENCE TO RELATED APPLICATION

This application is based on and claims priority under 35 U.S.C. § 119 to Korean Patent Application No. 10-2022-0080533, filed on Jun. 30, 2022 in the Korean Intellectual Property Office, the disclosure of which is incorporated herein by reference.

TECHNICAL FIELD

The present disclosure relates to a magnetic material wireless charging and a manufacturing method thereof. The magnetic material may have a three-dimensional shape and include a Mn—Zn ferrite sintered body and a powder mixture (e.g., Mn—Zn ferrite sintered powder and thermosetting powder).

BACKGROUND

Wireless charging devices for electric vehicle batteries include a coil that convers electric energy into magnetic energy (magnetic field) and a magnetic material in charge of strengthening and shieling to allow the generated magnetic field to have an orientation.

In general, a Mn—Zn ferrite sintered magnetic material having a high magnetic permeability (about 4,000μ) has been used in a transmitter/receiver of a battery wireless charging device in consideration of charging efficiency. However, because a Mn—Zn ferrite sintered material is highly brittle, there is a high risk of breakage in the case of an impact while a vehicle is driven.

Meanwhile, large-sized magnetic materials having a size of 300 mm×300 mm or greater are required as magnetic materials used in wireless charging systems for vehicles. To this end, a method of implementing a large-sized magnetic material by arranging a plurality of Mn—Zn ferrite tiles has been used. However, there is a problem in that such a large-sized magnetic material has low impact resistance due to high embrittlement and low productivity due to inefficient assembly.

SUMMARY

In preferred aspects, provided is a wireless charging magnetic material having increased charging efficiency by implementing a three-dimensional shape by mixing a Mn—Zn ferrite sintered body with a powder and having enhanced impact resistance by including a thermosetting coating mixed therein, and a manufacturing method thereof.

In one aspect, magnetic material suitable for wireless charging is provided, the magnetic material comprising: a) a Mn—Zn ferrite sintered body; b) a thermosetting powder coating; and c) a Mn—Zn ferrite sintered powder. In an embodiment the Mn—Zn ferrite sintered body comprises a Mn—Zn ferrite sintered tile and/or a Mn—Zn ferrite sintered chip. Suitably, the magnetic material is implemented inn a three-dimensional shape.

In an embodiment, the magnetic material comprises a Mn—Zn ferrite sintered tile that is preferably disposed in a powder body comprising the Mn—Zn ferrite sintered powder and the thermosetting powder coating in a sandwich shape. In an embodiment, the magnetic material comprises a Mn—Zn ferrite sintered tile is disposed to be horizontal or parallel to the ground. In an embodiment, the magnetic material comprises a Mn—Zn ferrite sintered chip is uniformly disposed throughout the magnetic material in a mixed form with the Mn—Zn ferrite sintered powder and the thermosetting powder coating.

In a further aspect, a wireless charging magnetic material includes: a Mn—Zn ferrite sintered body; a thermosetting powder coating; and a Mn—Zn ferrite sintered powder. The Mn—Zn ferrite sintered body includes a Mn—Zn ferrite sintered tile or a Mn—Zn ferrite sintered chip, and the wireless charging magnetic material is implemented in a three-dimensional shape.

The term "thermosetting powder coating" as used herein refers to a thermosetting polymer resin provided in a form of powders or particles, which may partially or entirely cover the other material contained in the same mixture or matrix. The thermosetting polymer resin includes polymers that are irreversibly hardened or cured by heat or UV radiation, and exemplary thermosetting polymers used for thermosetting powder coating include one or more selected from polyesters, vinylesters, epoxies, phenolics, polyamides (PA), bismaleimides (BMI), and polyurethane resins. Preferably, the exemplary thermosetting polymer resins are provided in a power form, or in particular forms to cover the magnetic materials, e.g., Mn—Zn ferrite sintered powder or Mn—Zn ferrite sintered body. The Mn—Zn ferrite sintered tile may be disposed in a powder body including the Mn—Zn ferrite sintered powder and the thermosetting powder coating in a sandwich shape.

The Mn—Zn ferrite sintered tile may be disposed to be horizontally.

The Mn—Zn ferrite sintered chip may be uniformly disposed throughout the wireless charging magnetic material in a mixed form with the Mn—Zn ferrite sintered powder and the thermosetting powder coating.

The thermosetting powder coating may include an acrylic compound, a polyester compound, and an epoxy compound, or combinations thereof.

The thermosetting powder coating may have a diameter of about 30 to 40 μm.

The Mn—Zn ferrite sintered powder may further include coarse powder and fine powder.

The coarse powder of the Mn—Zn ferrite sintered powder may have a diameter of about 80 to 100 and the fine powder of the Mn—Zn ferrite sintered powder may have a diameter of about 10 to 20 μM.

A charging efficiency may be about 90% or greater.

A sectional area may be about 0.01 $m^2$ or greater and a thickness is about 5 to 10 mm.

In an aspect, a method of manufacturing a magnetic material for wireless charging includes: providing a Mn—Zn ferrite sintered body, a thermosetting powder coating, and a Mn—Zn ferrite sintered powder; preparing an admixture including coarse powder of the Mn—Zn ferrite sintered powder and fine powder of the Mn—Zn ferrite sintered powder and preparing a powder body including the admixture and the thermosetting powder coating; filling the powder body and the Mn—Zn ferrite sintered body in a three-dimensional mold and tapping the filled materials; and curing the tapped materials by heating to prepare the magnetic material. The Mn—Zn ferrite sintered body includes a Mn—Zn ferrite sintered tile or a Mn—Zn ferrite sintered chip.

The thermosetting powder coating may include an acrylic compound, a polyester compound, an epoxy compound or combinations thereof.

The thermosetting powder coating may have a diameter of about 30 to 40 μm.

The Mn—Zn ferrite sintered powder may further include coarse powder and fine powder.

The coarse powder of the Mn—Zn ferrite sintered powder may have a diameter of about 80 to 100 μm, and the fine powder of the Mn—Zn ferrite sintered powder has a diameter of about 10 to 20 μm.

The Mn—Zn ferrite sintered tile may be filled to be disposed in the powder body including the Mn—Zn ferrite sintered powder with the thermosetting powder coating in a sandwich shape and tapped.

The Mn—Zn ferrite sintered tile may be disposed to be horizontally.

The Mn—Zn ferrite sintered chip may be mixed with the Mn—Zn ferrite sintered powder and the thermosetting powder coating and uniformly filled throughout a three-dimensional mold, and then tapped.

The curing operation may be performed by increasing a temperature to about 160 to 200° C. at a heating rate of about 5 to 50° C./min and maintaining the temperature for 15 to 80 minutes.

In an aspect, provided is a device for vehicle including magnetic material as described herein.

Also provided is a vehicle comprising the vehicle device as described herein.

Other aspects of the disclosure are disclosed infra.

DETAILED DESCRIPTION

Reference will now be made in detail to the embodiments of the present disclosure, examples of which are illustrated in the accompanying drawings. The embodiments described in the specification and shown in the drawings are only illustrative and are not intended to represent all aspects of the disclosure, such that various modifications may be made without departing from the spirit of the invention.

In addition, the terms used throughout the specification are merely used to describe particular embodiments, and are not intended to limit the present disclosure. An expression used in the singular encompasses the expression of the plural unless it has a clearly different meaning in the context.

In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

The reference numerals used in operations are used to distinguish operations for descriptive convenience and are not intended to describe the order of operations and the operations may be performed in a different order unless the order of operations are clearly stated.

In an expression "at least one of" used to refer a list of elements in the specification, the combination of the elements may be modified. For example, the expression "at least one of a, b, or c" may be understood as indicating only a, only b, only c, both a and b, both a and c, both b and c, or all of a, b, and c.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, embodiments of the present disclosure will be described in detail with reference to the accompanying drawings.

A magnetic material for wireless charging system (or "wireless charging magnetic material") according to an exemplary embodiment of the present disclosure may include a Mn—Zn ferrite sintered body; a thermosetting powder coating; and a Mn—Zn ferrite sintered powder. The Mn—Zn ferrite sintered body may include a Mn—Zn ferrite sintered tile or a Mn—Zn ferrite sintered chip, and the wireless charging magnetic material may have a three-dimensional shape.

Figure 1:
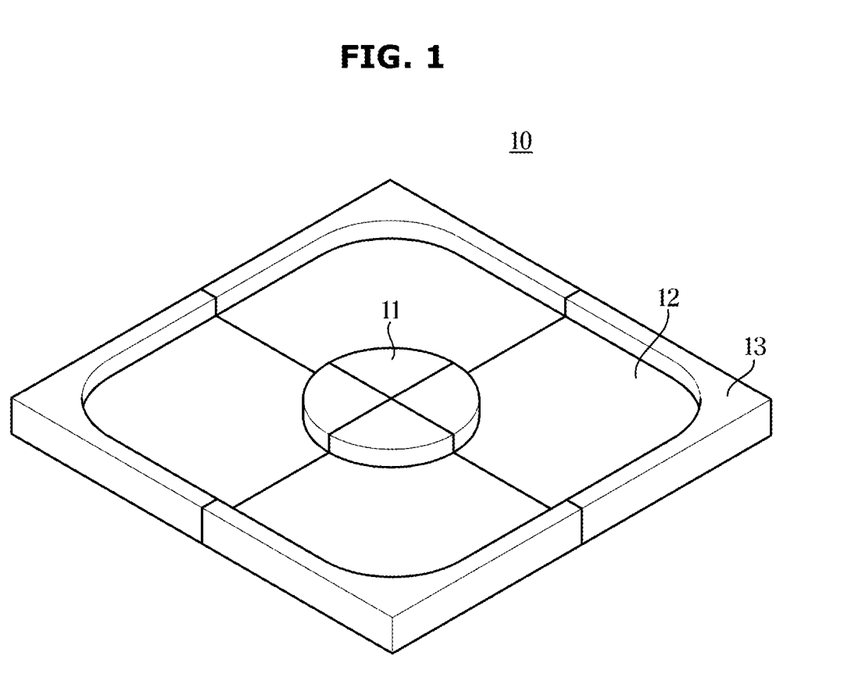
FIG. 1 shows an exemplary wireless charging magnetic material according to an exemplary embodiment of the present disclosure.

FIG. 1 shows an exemplary wireless charging magnetic material according to an exemplary embodiment of the present disclosure.

As shown in FIG. 1, a wireless charging magnetic material 10 may include a central region 11, edge regions 13, and a flat region 12. The wireless charging magnetic material 10 may be manufactured by assembling four magnetic materials respectively manufactured by baking using a three-dimensional mold. Although a rectangular shape thereof is illustrated in FIG. 1 by way of example, various shapes may be applied thereto.

The wireless charging magnetic material 10 may include a Mn—Zn ferrite sintered body; a thermosetting powder coating 23; and a Mn—Zn ferrite sintered powder 24, and the Mn—Zn ferrite sintered body may include a Mn—Zn ferrite sintered tile 21 or a Mn—Zn ferrite sintered chip 22.

Figure 2:
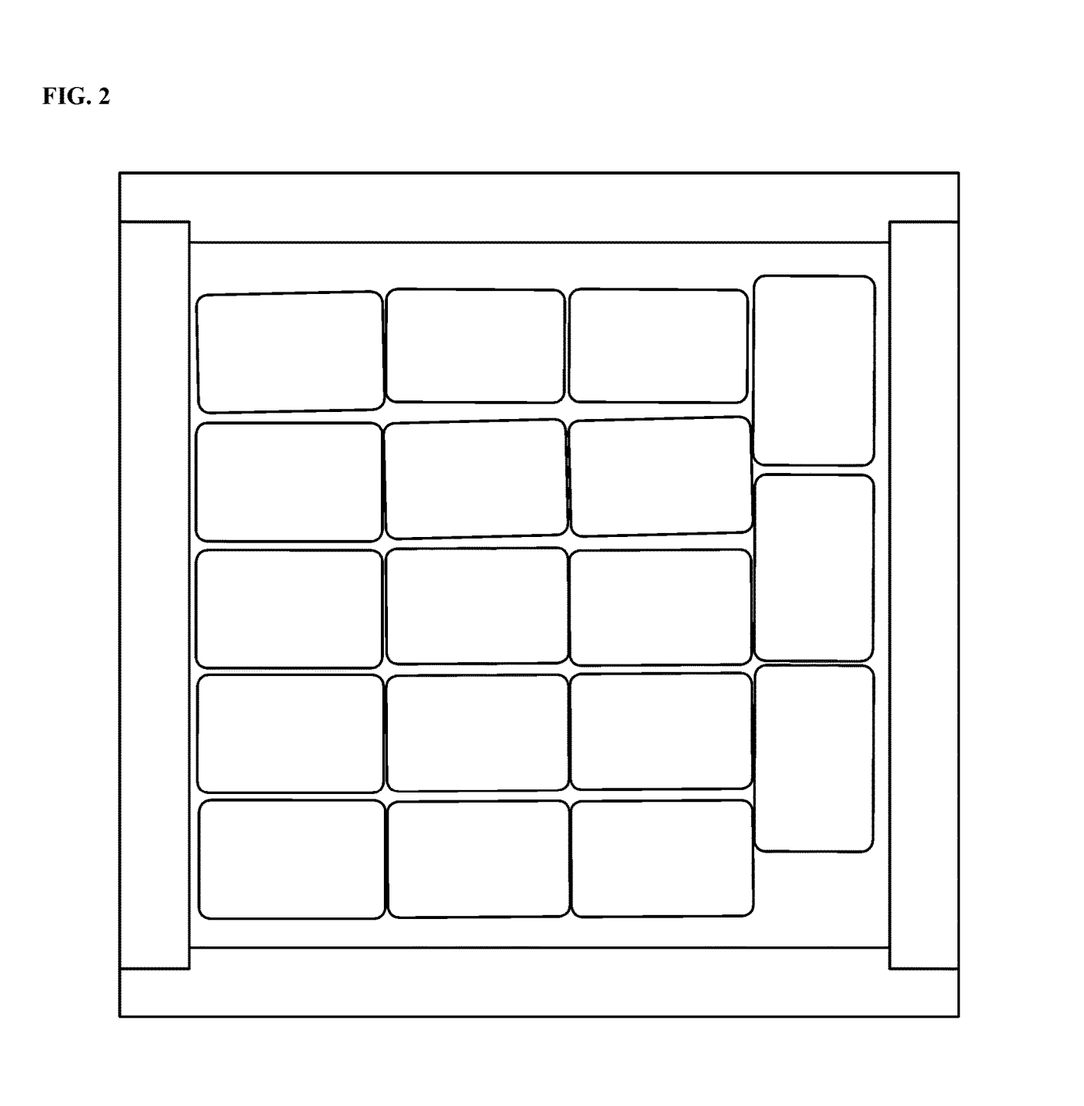
FIG. 2 shows exemplary Mn—Zn ferrite sintered tiles according to an exemplary embodiment of the present disclosure.
Figure 3:
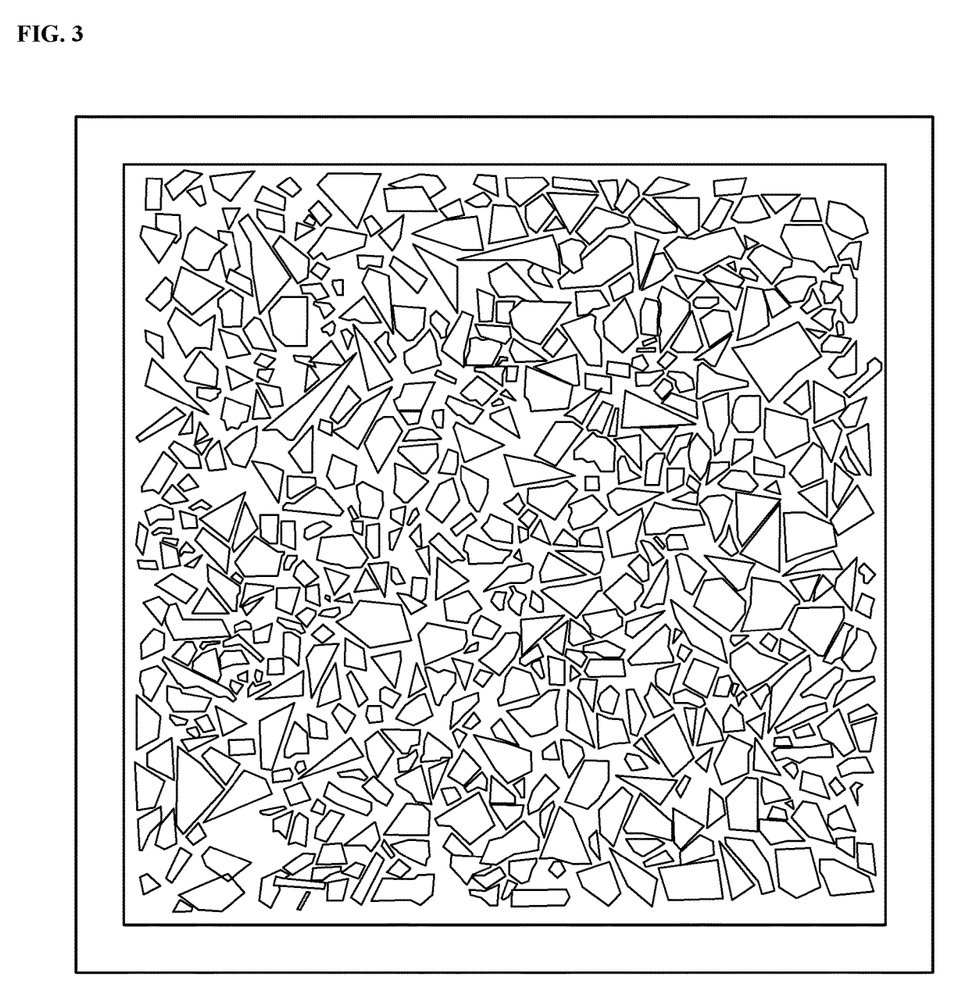
FIG. 3 shows exemplary Mn—Zn ferrite sintered chips according to an exemplary embodiment of the present disclosure.

FIG. 2 shows exemplary Mn—Zn ferrite sintered tiles according to an exemplary embodiment of the present disclosure. FIG. 3 show exemplary Mn—Zn ferrite sintered chips according to an exemplary embodiment of the present disclosure.

As shown in FIGS. 2 and 3, the Mn—Zn ferrite sintered tile 21 may have a rectangular shape, and the Mn—Zn ferrite sintered chip 22 may have a polygonal shape and be smaller than the Mn—Zn ferrite sintered tile 21.

Meanwhile, when a length of one side is greater than the thickness, the magnetic material may be classified as a ferrite sintered tile, and when a length of one side is less than the thickness, the magnetic material may be classified as a ferrite sintered chip. For example, when the thickness is 4 mm, the length and the width may be 4 mm or greater in the ferrite sintered tile, and the length of one side may be less than 4 mm in the ferrite sintered chip.

In the present disclosure, the ferrite sintered tile and chip may belong to low loss ferrite series and may include an amount of about 5 to 8 wt % of ZnO, an amount of about 22.5 to 25 wt % of $Mn_3O_4$, and the balance of $Fe_2O_3$, based on the total weight of the ferrite sintered material, i.e. tile and chip.

The Mn—Zn ferrite sintered body may enhance charging performance by improving magnetic permeability and magnetic flux density of the wireless charging magnetic material 10. The Mn—Zn ferrite sintered body may be the Mn—Zn ferrite sintered tile 21 or the Mn—Zn ferrite sintered chip 22.

The components of the wireless charging magnetic material 10 may be the Mn—Zn ferrite sintered tile 21, the thermosetting powder coating 23, and the Mn—Zn ferrite sintered powder 24, or the Mn—Zn ferrite sintered chip 22, the thermosetting powder coating 23, and the Mn—Zn ferrite sintered powder 24.

when the Mn—Zn ferrite sintered tile 21 is used, the Mn—Zn ferrite sintered tile 21 may be added in an amount of about 22.1 to 44.5 wt % based on the total weight of the magnetic material in consideration of charging efficiency and productivity.

When the Mn—Zn ferrite sintered chip 22 is used, the Mn—Zn ferrite sintered chip 22 may be added in an amount of about 40 to 50 wt % based on the total weight of the magnetic material in consideration of charging efficiency and product size.

The thermosetting powder coating 23 may provide rigidity of the wireless charging magnetic material 10 formed in a three-dimensional shape and maintain the shape. Although the Mn—Zn ferrite sintered material is used, it is possible to obtain a strength sufficient to be used in parts of vehicles.

As the amount of the thermosetting powder coating 23 increases, the strength increases but magnetic permeability may decrease. Thus, the thermosetting powder coating 23 may be added in an amount of about 1 to 10 wt % based on the total weight of the magnetic material. Preferably, the thermosetting powder coating 23 may be added in an amount of about 1 to 3 wt % based on the total weight of the magnetic material.

In addition to the Mn—Zn ferrite sintered body and the thermosetting powder coating 23, the other component may include the Mn—Zn ferrite sintered powder 24.

The Mn—Zn ferrite sintered powder 24 may serve to implement a three-dimensional shape, facilitate formation of a large-sized magnetic material, and fix the Mn—Zn ferrite sintered body in the wireless charging magnetic material.

The wireless charging magnetic material 10 may be implemented to have a three-dimensional shape. A magnetic material having a two-dimensional shape may be located only in the central region of the flat coil. However, the magnetic material having a three-dimensional shape may also be located in the sides of the flat coil as well as the central region of the flat coil, and thus the magnetic field generated by the coil may be effectively used. The magnetic flux leakage may decrease in the magnetic material having the three-dimensional shape, so that electromagnetic properties may be enhanced and charging performance may be improved.

In the present disclosure, by realizing the magnetic material having a three-dimensional shape, sufficient charging performance may be obtained even using the Mn—Zn ferrite sintered powder 24 having a relatively low magnetic permeability.

Figure 4:
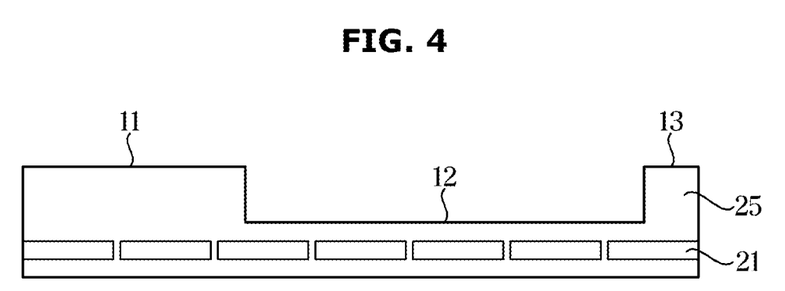
FIG. 4 shows an exemplary wireless charging magnetic material using exemplary Mn—Zn ferrite sintered tiles.

FIG. 4 shows an exemplary wireless charging magnetic material using Mn—Zn ferrite sintered tiles according to an exemplary embodiment of the present disclosure.

As shown in FIG. 4, the Mn—Zn ferrite sintered tiles 21 may be disposed in a powder body which may be prepared by mixing the Mn—Zn ferrite sintered powder 24 and the thermosetting powder coating 23, in a sandwich shape.

In addition, the Mn—Zn ferrite sintered tiles 21 may be disposed horizontally.

Figure 5:
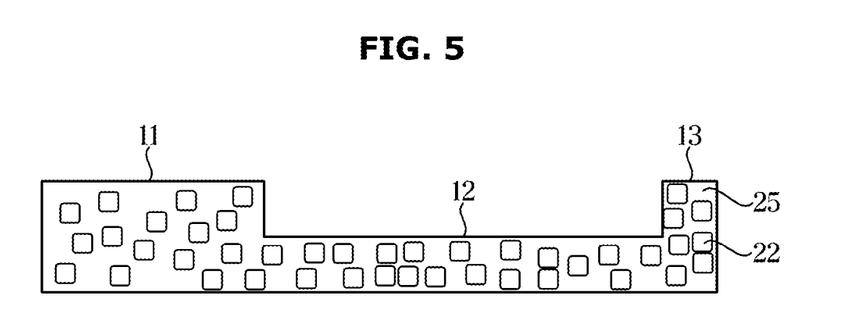
FIG. 5 shows an exemplary wireless charging magnetic material using exemplary Mn—Zn ferrite sintered chips.

FIG. 5 shows an exemplary wireless charging magnetic material using Mn—Zn ferrite sintered chips.

As shown in FIG. 5, the Mn—Zn ferrite sintered chips 22 may be mixed with the Mn—Zn ferrite sintered powder 24 and the thermosetting powder coating 23 and located uniformly throughout the wireless charging magnetic material 10.

Although the Mn—Zn ferrite sintered chip 22 has a less magnetic permeability than the Mn—Zn ferrite sintered tile 21, charging efficiency may be improved thereby because the Mn—Zn ferrite sintered chips 22, which are uniformly distributed throughout the wireless charging magnetic material 10, affect the magnetic flux density on left and right sides as well as the bottom of the coil. However, the content of the Mn—Zn ferrite sintered chips 22 may be greater than that of the Mn—Zn ferrite sintered tiles 21.

The thermosetting powder coating 23 may include at least one of acrylic, polyester, and epoxy coatings.

The thermosetting powder coating 23 may have a diameter of about 30 to 40 μm.

The Mn—Zn ferrite sintered powder 24 may include coarse powder and fine powder.

The coarse powder of the Mn—Zn ferrite sintered powder may have a diameter of about 80 to 100 μm, and the fine powder of the Mn—Zn ferrite sintered powder may have a diameter of about 10 to 20 μm.

As the content of the Mn—Zn ferrite sintered powder 24 increases, the magnetic permeability may deteriorate. To prevent this deterioration in the magnetic permeability, the Mn—Zn ferrite sintered powder may be prepared by mixing coarse powder with fine powder in the present disclosure.

When coarse powder and fine powder of the Mn—Zn ferrite sintered powder are mixed in an appropriate ratio and tapped, density increases result in enhancement of magnetic permeability. Preferably, an amount of about 30 to 50 wt % of fine powder may be mixed with the balance of coarse powder, or particularly, an amount of about 40 wt % of fine powder may be mixed with the balance of the coarse powder.

In addition, the Mn—Zn ferrite sintered powder 24 may include an amount of about 30 to wt % of fine powder with the balance of coarse powder, which may satisfy a magnetic flux density of about 0.09 to 1.1 T when a magnetic field of 4000 A/m is applied thereto.

The wireless charging magnetic material 10 may have a charging efficiency of about 90% or greater.

The wireless charging magnetic material 10 may have a sectional area of about 0.01 m² and a thickness of about 5 to 10 mm.

In the present disclosure, a magnetic material with a large area of about 0.01 m² or greater may be implemented using the Mn—Zn ferrite sintered body, the thermosetting powder coating 23, and the Mn—Zn ferrite sintered powder 24 by baking with a three-dimensional mold without applying a high pressure thereto.

Meanwhile, in consideration of impact resistance, a thickness of the wireless charging magnetic material 10 may be adjusted to a range of about 5 to 10 mm. However, the embodiment is not limited thereto and the thickness may vary depending on the purpose and function thereof.

Hereinafter, a method of manufacturing a wireless charging magnetic material according to another embodiment of the present disclosure will be described.

Figure 6:
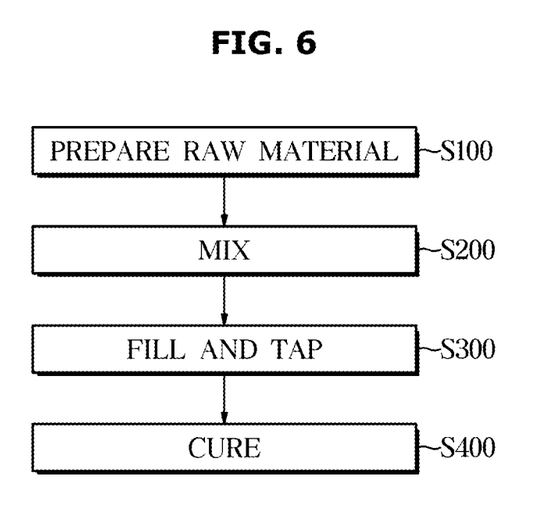
FIG. 6 shows an exemplary method of manufacturing a wireless charging magnetic material according to an exemplary embodiment of the present disclosure.

FIG. 6 shows an exemplary method of manufacturing a wireless charging magnetic material according to an exemplary embodiment of the present disclosure.

As shown in FIG. 6, a method of manufacturing a wireless charging magnetic material may include: providing a Mn—Zn ferrite sintered body, a thermosetting powder coating, and a Mn—Zn ferrite sintered powder (S100); preparing an admixture including coarse powder of the Mn—Zn ferrite sintered powder and fine powder of the Mn—Zn ferrite sintered powder and preparing a powder body including the admixture and the thermosetting powder coating (S200); filling the powder body and the Mn—Zn ferrite sintered body in a three-dimensional mold and tapping the filled materials (S300); and curing the tapped materials by heating to prepare a magnetic material (S400).

In the step of S100, the Mn—Zn ferrite sintered body, the thermosetting powder coating, and the Mn—Zn ferrite sintered powder are provided or prepared.

The Mn—Zn ferrite sintered body may include a Mn—Zn ferrite sintered tile 21 or a Mn—Zn ferrite sintered chip 22.

The thermosetting powder coating 23 may include at least one of acrylic, polyester, and epoxy coatings.

The thermosetting powder coating 23 may have a diameter of about 30 to 40 μm.

The Mn—Zn ferrite sintered powder 24 may include coarse powder and fine powder.

The coarse powder of the Mn—Zn ferrite sintered powder may have a diameter of about 80 to 100 μm, and the fine powder of the Mn—Zn ferrite sintered powder may have a diameter of about 10 to 20 μm.

In the step of S200, after the coarse powder and the fine powder of the Mn—Zn ferrite sintered powder are mixed, and the mixture may further be mixed with the thermosetting powder coating 23 to prepare the powder body 25. In this regard, they may be uniformly mixed using a device such as a double cone, a V cone, and a zero-gravity mixer.

Figure 7:
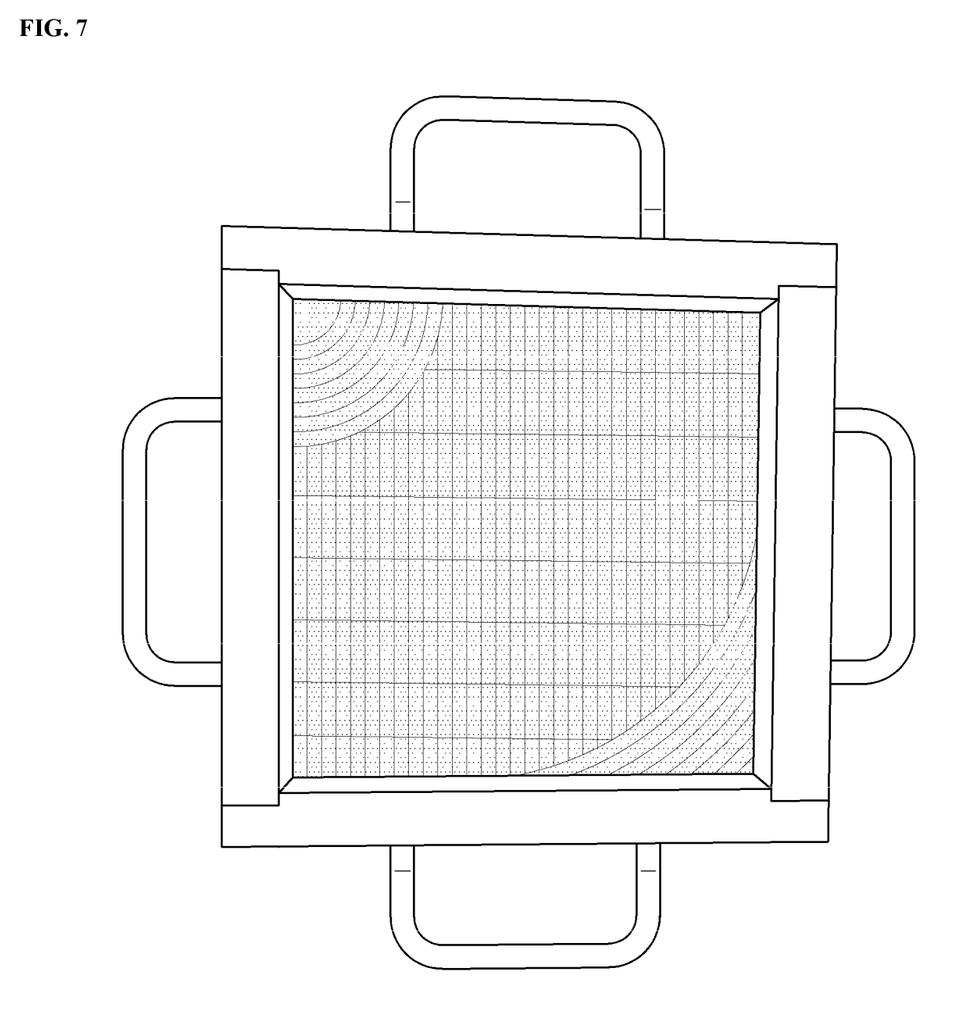
FIG. 7 shows an exemplary three-dimensional mold used in a filling and tapping operation according to an exemplary embodiment of the present disclosure.

FIG. 7 shows an exemplary three-dimensional mold used in a filling and tapping operation. In the step of S300, after the powder body 25 and the Mn—Zn ferrite sintered body are filled in the three-dimensional mold, the materials may be tapped.

In the case of using the Mn—Zn ferrite sintered tiles 21 as the Mn—Zn ferrite sintered body, first, the powder body 25 may be filled and the Mn—Zn ferrite sintered tiles 21 are arranged on the filled powder body 25 to be horizontally, and the powder body 25 may be filled thereon.

In the case of using the Mn—Zn ferrite sintered chips 22 as the Mn—Zn ferrite sintered body, the Mn—Zn ferrite sintered chips 22 may be mixed with the powder body 25 such that the Mn—Zn ferrite sintered chips 22 are uniformly distributed in the three-dimensional mold.

By locating the powder body 25 in the Mn—Zn ferrite sintered body, the mold may be filled without empty space therebetween.

After the ferrite sintered body and the powder body 25 are filled, the three-dimensional mold may be tapped in three axial directions.

In the curing operation (S400), the tapped materials are cured by heating to prepare a magnetic material. In this regard, the curing operation (S400) may be performed by increasing the temperature to about 160 to 200° C. at a heating rate of about 5 to 50° C./min and maintaining the temperature for about 15 to 80 minutes.

When the heating rate is less than the predetermined rate, e.g., less than about 5° C./min, the thermosetting powder coating turns to a liquid phase and flows in the direction of gravity, thereby causing non-uniform distribution. Therefore, the heating rate may be as high as possible.

When the heating temperature is too high, strength may deteriorate, and thus the heating temperature may be from about 160 to about 200° C.

EXAMPLES

Hereinafter, the present disclosure will be described in more detail with reference to the following examples and comparative examples. However, the following examples are merely presented to exemplify the contents and effects of the present disclosure, and the scope and effects of the present disclosure are not limited thereto.

Evaluation of Charging Efficiency

Materials shown in Table 1 below were filled in a mold and tapped, and then the mold was heated to 180° C. at a heating rate of 10° C./min and cured for 60 minutes to prepare samples.

In Example 1, a wireless charging magnetic material according to an embodiment of the present disclosure was prepared in a three-dimensional shape by using a Mn—Zn ferrite sintered body and a sintered powder. In this case, Mn—Zn ferrite sintered tiles were used as the Mn—Zn ferrite sintered body, and the wireless charging magnetic material was prepared by mixing 44.5 wt % of the Mn—Zn ferrite sintered tiles, 3 wt % of a thermosetting powder coating, and the balance of a Mn—Zn ferrite sintered powder.

A two-dimensional shape was formed using the Mn—Zn ferrite sintered powder in Comparative Example 1, and a three-dimensional shape was formed using the Mn—Zn ferrite sintered powder in Comparative Example 2.

The magnetic permeability was obtained by measuring inductance using an LCR meter based on the IEC 60406-6 and calculating using Equation (1) below.

$$L = \frac{0.4\pi\mu N^2 A \times 10^{-2}}{l} \quad \text{Equation (1)}$$

In Equation (1), L is an inductance, N is a winding number, A is a sectional area of a core, and l is a length of an average magnetic path.

Rac is an alternating current resistance and was measured using a digital multimeter (DMM) at room temperature.

A magnetic material loss refers to a power loss due to a magnetic material itself of a transmitter/receiver during charging. The magnetic material loss is calculated using Equation (2) below.

Magnetic material loss=total loss−inverter loss−rectifier loss−compensation circuit loss. Equation (2):

The total loss is a value obtained by subtracting an output power from an input power of a system.

The inverter loss is calculated using an inverter input voltage, an input current, a switch-turn off time, and Duty ratio.

The rectifier loss is calculated using an input voltage and an output voltage of a diode.

The compensation circuit loss is calculated using current and equivalent series resistance (ESR).

The charging efficiency was obtained by calculating a ratio of an output power to an input powder. In this regard, the input power was 3.3 kW.

TABLE 1

| Example | Material | Shape | Magnetic permeability | Rac (mΩ) | Magnetic material loss (W) | Charging efficiency (%) |
|---|---|---|---|---|---|---|
| Example 1 | Mn—Zn ferrite sintered body and powder | 3D | 1475 | 68.1 | 33.6 | 92.3 |
| Comparative Example 1 | Mn—Zn ferrite sintered powder | 2D | 95 | 131.3 | 339.3 | 80.7 |
| Comparative Example 2 | Mn—Zn ferrite sintered powder | 3D | 12 | 92.7 | 164.2 | 87.5 |

Upon comparison between Comparative Examples 1 and 2 of Table 1, although the magnetic permeability of the magnetic material having the 3D shape was less than that of the magnetic material having the 2D shape, the magnetic material having the 3D shape had less magnetic material loss and greater charging efficiency than those of the magnetic material having the 2D shape.

Also, upon comparison between Example 1 and Comparative Example 2, not only greater magnetic permeability was obtained, but also a low magnetic material loss and greater charging efficiency were obtained by using the Mn—Zn ferrite sintered body and powder together when compared to the case of using the Mn—Zn ferrite sintered powder alone.

A very high charging efficiency was obtained in the wireless charging magnetic material implemented in the three-dimensional shape by using the Mn—Zn ferrite sintered body and powder together according to an embodiment of the present disclosure.

In Table 2 below, charging efficiencies with respect to the contents of the Mn—Zn ferrite sintered body, the thermosetting powder coating, and the Mn—Zn ferrite sintered powder are shown.

The charging efficiency was obtained by calculating a ratio of an output power to an input power. In this case, the input power was 3.3 kW.

TABLE 2

| | Composition (wt %) | | | | |
|---|---|---|---|---|---|
| | Mn—Zn ferrite sintered body | | | Mn—Zn ferrite | Charging |
| Example | Mn—Zn ferrite sintered tile | Mn—Zn ferrite sintered chip | Thermosetting powder coating | sintered powder | efficiency (%) |
| Example 2 | 22.1 | — | 3 | 74.9 | 90.6 |
| Example 3 | 33.3 | — | 3 | 63.7 | 91.5 |
| Example 1 | 44.5 | — | 3 | 52.5 | 92.3 |

TABLE 2-continued

| | Composition (wt %) | | | | |
|---|---|---|---|---|---|
| | Mn—Zn ferrite sintered body | | | Mn—Zn ferrite | Charging |
| Example | Mn—Zn ferrite sintered tile | Mn—Zn ferrite sintered chip | Thermosetting powder coating | sintered powder | efficiency (%) |
| Example 4 | — | 40 | 3 | 57 | 90.3 |
| Example 5 | — | 50 | 3 | 47 | 90.4 |
| Comparative Example 3 | — | — | — | 100 | 87.5 |

As shown in Table 2, all of Examples 1 to 5 in which both the Mn—Zn ferrite sintered body and the Mn—Zn ferrite sintered powder were used satisfied the charging efficiency of at least 90%.

However, Comparative Example 3 in which the Mn—Zn ferrite sintered powder was used alone did not satisfy the charging efficiency of at least 90%.

In addition, referring to Examples 1 and 4, it was confirmed that the charging efficiency decreased as the content of the Mn—Zn ferrite sintered body decreased.

Mixing ratio of coarse powder and fine powder of Mn—Zn ferrite sintered powder

In Table 3, magnetic flux densities and magnetic permeabilities of magnetic materials, as magnetic materials prepared using the Mn—Zn ferrite sintered powder, with respect to a mixing ratio of coarse powder to fine powder of the Mn—Zn ferrite sintered powder are shown.

The magnetic flux density changing in accordance with a magnetic field applied thereto was measured at room temperature using an Iwatsu B-H analyzer according to IEC 62044-2. In the table below, magnetic flux densities obtained by applying a magnetic field of 4000 A/m are shown.

The magnetic permeability was calculated by measuring inductance using an LCR meter according to IEC 60406-6 and calculated using Equation (1) below.

$$L = \frac{0.4\pi\mu N^2 A \times 10^{-2}}{l} \quad \text{Equation (1)}$$

In Equation (1), L is an inductance, N is a winding number, A is a sectional area of a core, and l is a length of an average magnetic path.

TABLE 3

| Mn—Zn ferrite sintered powder (wt %) | | Magnetic flux | Magnetic |
|---|---|---|---|
| Coarse powder | Fine powder | density (T) | permeability |
| 100 | 0 | 0.075 | 16.12 |
| 90 | 10 | 0.081 | 17.47 |
| 80 | 20 | 0.088 | 18.94 |
| 70 | 30 | 0.098 | 19.04 |
| 60 | 40 | 0.103 | 23.06 |
| 50 | 50 | 0.097 | 20.68 |
| 0 | 100 | 0.079 | 13.53 |

As shown in Table 3, magnetic flux density and magnetic permeability were the greatest in the case of mixing 30 to 50 wt % of fine powder with the balance of coarse powder.

Therefore, a phenomenon of decreasing magnetic permeability caused by the Mn—Zn ferrite sintered powder may be inhibited by appropriately controlling the mixing ratio of fine powder and coarse powder.

According to various exemplary embodiment of the present disclosure, provided is a wireless charging magnetic material having increased charging efficiency by implementing a three-dimensional shape and having enhanced impact resistance by including a thermosetting coating mixed therein.

Also, provided is a method of manufacturing a wireless charging magnetic material by baking using a three-dimensional mold without applying a high pressure to prepare a large-sized magnetic material.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A magnetic material for wireless charging, comprising:
   a Mn—Zn ferrite sintered body;
   a thermosetting powder coating; and
   a Mn—Zn ferrite sintered powder, and
   wherein the Mn—Zn ferrite sintered body comprises a Mn—Zn ferrite sintered tile or a Mn—Zn ferrite sintered chip,
   wherein the Mn—Zn ferrite sintered powder further comprises coarse powder and fine powder,
   wherein the coarse powder of the Mn—Zn ferrite sintered powder has a diameter of 80 to 100 μm, and the fine powder of the Mn—Zn ferrite sintered powder has a diameter of 10 to 20 μm,
   wherein the magnetic material has a charging efficiency is 90% or greater.

2. The magnetic material of claim 1 wherein the Mn—Zn ferrite sintered body comprises a Mn—Zn ferrite sintered tile and a Mn—Zn ferrite sintered chip.

3. The magnetic material of claim 1 wherein the magnetic material is implemented in a three-dimensional shape.

4. The magnetic material according to claim 1, wherein the magnetic material comprises Mn—Zn ferrite sintered tile that is disposed in a powder body comprising the Mn—Zn ferrite sintered powder and the thermosetting powder coating in a sandwich shape.

5. The magnetic material according to claim 4, wherein the Mn—Zn ferrite sintered tile is disposed to be horizontally.

6. The magnetic material according to claim 1, wherein the magnetic material comprises a Mn—Zn ferrite sintered chip that is uniformly disposed throughout the magnetic material in a mixed form with the Mn—Zn ferrite sintered powder and the thermosetting powder coating.

7. The magnetic material according to claim 1, wherein the thermosetting powder coating comprises an acrylic compound, a polyester compound, an epoxy compound or combinations thereof.

8. The magnetic material according to claim 7, wherein the thermosetting powder coating has a diameter of 30 to 40 μm.

9. The magnetic material according to claim 1, wherein the magnetic material has a sectional area of is 0.01 m$^2$ or greater and a thickness is 5 to 10 mm.

10. A device for vehicle comprising a magnetic material of claim 1.

11. A vehicle comprising a vehicle device of claim 10.

* * * * *